United States Patent [19]

Piampiano

[11] 4,389,102
[45] Jun. 21, 1983

[54] EYEGLASS TEMPLE BAR RETAINING MEANS

[76] Inventor: Carl P. Piampiano, 262 Seminole Rd., Atlantic Beach, Fla. 32233

[21] Appl. No.: 207,384

[22] Filed: Nov. 17, 1980

[51] Int. Cl.³ .................. G02C 5/14; G02C 1/00; G02C 3/00
[52] U.S. Cl. .................. 351/123; 351/158; 351/156
[58] Field of Search ............ 351/123, 158, 156, 114, 351/111; 2/448

[56] References Cited

U.S. PATENT DOCUMENTS 3,266,111 8/1966 Abel .................. 351/158
3,917,387 11/1975 Ensing .................. 351/123

Primary Examiner—John K. Corbin
Assistant Examiner—Rodney B. Bovernick
Attorney, Agent, or Firm—Balogh, Osann, Kramer, Dvorak, Genova & Traub

[57] ABSTRACT

A temple bar restraining means for eyeglass frames comprising one or more ear-engaging cords which extend between the distal and proximate ends of each of the temple bar ear hook portions or spatulas, and which project thereacross in chordal fashion so as to receive the thrust of the rear portions of the outer ear cartilages of conchas and thus yieldingly draw the eyeglass frames rearwardly on the forehead so as to prevent the frame from slipping with consequent eyeglass lens misalignment. Provision is made for selective application of the elastic cords to various points on the hook portion to vary the chordal relation, and provision is also made for varying the chordal tension at the time of cord application. In a modified form, both the chordal tension and the effective direction of cord application to the external ear may be adjusted after initial cord application. In another modification, the elastic ear-engaging chord is created by use of a slitted elastic spatula sock or boot instead of a cord.

11 Claims, 8 Drawing Figures

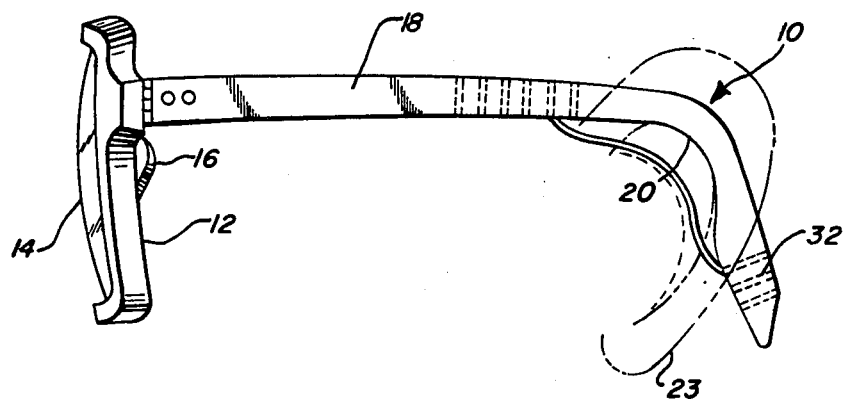
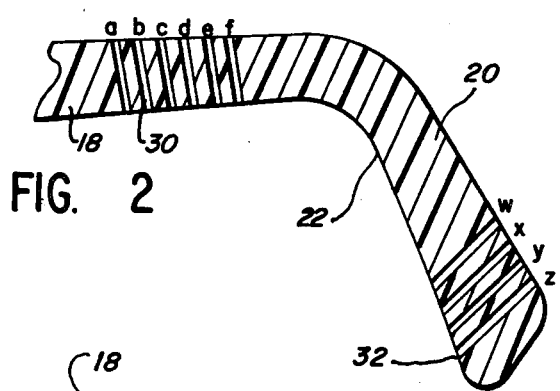
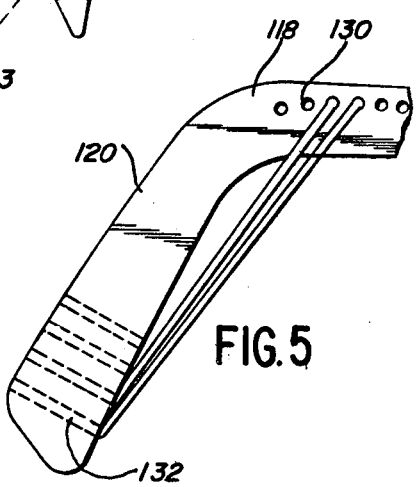
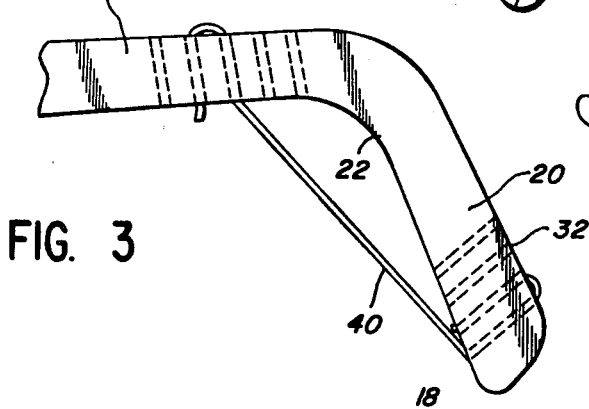
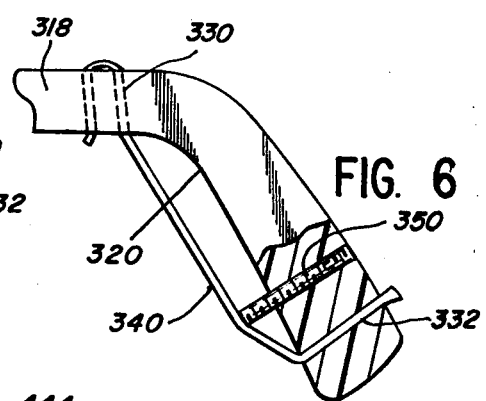
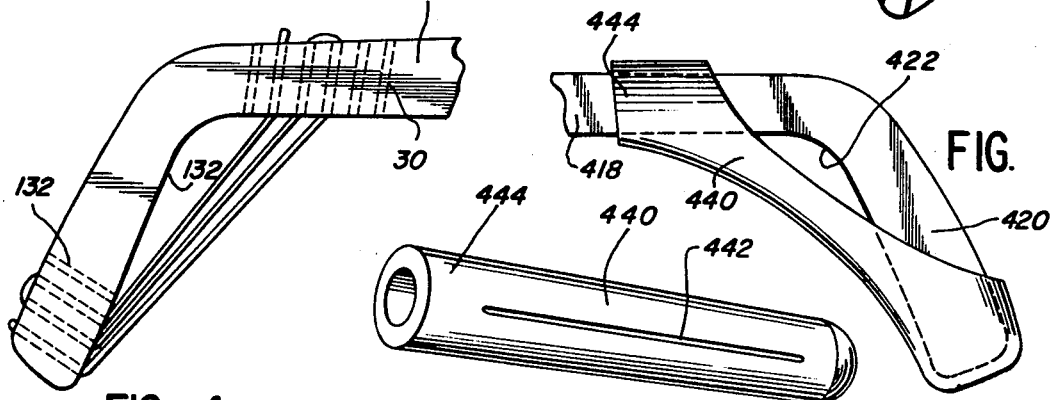

EYEGLASS TEMPLE BAR RETAINING MEANS

DISCLOSURE IN ACCORDANCE WITH SECTION 1.56 OF TITLE 37 CFR

Known Prior Art of Interest (U.S. Patents)

| Bussey  | 538,151   | April 23, 1895    |         |
|---------|-----------|-------------------|---------|
| Arrick  | 1,719,957 | July 9,1929       |         |
| Nelson  | 2,561,402 | July 24,1951      | 88-52   |
| Frum    | 2,626,538 | January 27,1953   | 88-52   |
| Hassman | 3,959,098 | November 8, 1960  | 88-52   |
| Bates   | 3,684,356 | August 15,1952    | 351-123 |
| Bidgood | 3,953,114 | April 27, 1956    | 351-123 |
| Guillet | 4,012,130 | March 15, 1977    | 151-114 |
| Luttner | 4,139,281 | February 13,1979  | 151-111 |

The present invention relates to eyeglass frames and has particular reference to apparatus for retaining such frames in place on the forehead of the user without discomfort, or the annoyance of slippage and possible loss thereof.

It is well recognized that even with the most expensive eyeglass frames, the initial careful fitting with invariably is offered by the optician seldom lasts throughout the life of the eyeglasses, especially if the wearer of the eyeglasses is physically active, if the eyeglasses are subjected to extreme and sudden temperature change or if they are carelessly treated or mishandled and not kept in a proper case. An initial fitting in the optician's office does not take into consideration outside influences that may arise at a future time tending to destroy the effect of the original fitting, as for example, a sudden extreme change in facial expression which may cause the eyeglass frame to slip from its initially adjusted position and not return, or a change in humidity resulting in a wet skin condition, or a forceful displacement or pushing of the frame to a maladjusted position or, in the case of a low quality inferior plastic frame, a gradual change in the flexibility of the plastic material. These effects may be cumulative so that, after a period of time, the initial adjustment loses its effectiveness and further attention by the optometrist is required.

Heretofore, in an effort to prolong or eliminate an interval between eyeglass frame fittings, various temple bar modifications or attachments had been devised. Some of these serve to change the circumferential extent of the ear hooks. Others enhance the frictional characteristics of the ear hooks with respect to the portions of the outside ears which they embrace. Still others increase the inward pressure of the temple bars against the sides of the head. Additionally, some such temple bar attachments employ weights which are strategically applied to the bars and tend to exert a gravitational force thereon in order to press them downwardly against the external ear to maintain proper eyeglass frame angularity. However, such attachments do not stabilize fore and aft longitudinal slipping of the frames. While such temple bar modifications or attachments may give a firmer support to the eyeglass frames, they nevertheless are possessed of certain limitations in that some of them do not give a satisfactory degree of comfort. Others render application of the eyeglass frames to, and removal thereof from, the face of the user difficult, while still others merely delay the time period which elapses before the frames accumulate sufficient distortion as to necessitate professional shape correction and refitting.

The present invention is designed to overcome the above-noted limitations that are attendant upon the construction and use of conventional eyeglass frames, with or without special temple bar modifications or additions, as outlined above, and, toward this end, it contemplates the provision of an eyeglass frame which, after proper selection thereof for size has been made, may be positioned on the head of the user with little or no initial adjustment, the frame having associated therewith temple bar restraining means of a self-adjusting nature which, regardless of the shape of the head of the user, will yieldingly bias the entire frame rearwardly, thus causing the nose bridge to ride high upon the nose in saddle-like fashion so as to bring the eyeglass lenses squarely in front of the eye pupils so that correct vision is instantly obtained and is maintained throughout the life of the eyeglasses. This is made possible by a continual biasing of the eyeglass frames rearwardly on the head of the user so that there are no stress areas or points which can develop cumulative strain in the frame tending to bend it out of its properly adjusted position.

The provision of a temple bar restraining means such as has briefly been outlined above, and possessing the stated advantages, constitutes the principal object of the present invention.

The restraining means consists of a cord or equivalent member that subtends the curved hook portion of the temple bar. The cord or equivalent member is preferably elastic. It is connected between the distal end of the hook of the temple bar and a point on the horizontal part of the temple bar, just before the curve of the hook occurs.

The form of the cord and the means for attachment of the cord to the temple bar are exemplified in the various embodiments of the invention.

In one embodiment, a plurality of closely spaced anchor points are established adjacent the proximate region of the hook protion where it joins the distal end of the linearly straight temple bar proper, and a similar series of closely spaced anchor points are established adjacent the distal end region of the hook portion or spatula. These anchor points make possible a wide variety of lacing patterns for one or more lengths of elastic cord material which may be laced between the two groups of anchor points in chordal fashion relative to the hook portion and under a predetermined degree of tension. The chord or chords which are thus established between the two groups of anchor points are thus yieldable when the hook portion is placed behind the cartilage or concha at the back of the ear in the usual manner of eyeglass frame installation. The elastic cords will partially be displaced from the straight positions, partially wrapping themselves around the ear concha. They will yieldingly urge the temple bars rearwardly on the head of the user, and thus literally pull the lens frames or windows squarely into position on the nose with the glass or other lenses properly positioned in front of the eye pupils for perfect vision. Various lacing patterns for the elastic cord in the production of one or more chordal spans are disclosed herein and, in a modified form of the invention, means for adjusting the tension of a chordal span after its initial installation on a temple bar is shown.

Other objects and advantages of the invention, not at this time enumerated, will readily suggest themselves as the following description ensues.

In the accompanying single sheet of drawings forming a part of this specification, several embodiments of the invention have been shown.

In these drawings:

FIG. 1 is a side elevational view of a pair of conventional eyeglasses, showing the improved temple bar restraining means operatively installed thereon.

FIG. 2 is an enlarged fragmentary sectional view taken substantially centrally and vertically through the distal end region and hook portion or spatula of one of the temple bars associated with the eyeglasses of FIG. 1 bit with the restraining means properly omitted in the interests of clarity.

FIG. 3 is a side elevational view of the structure shown in FIG. 2, showing a single strand of cord material laced across the curved hook portion of the temple bar in chordal fashion to provide a single yieldable restraining chord.

FIG. 4 is a fragmentary side elevational view, similar to FIG. 3, showing a single length of elastic cord laced across the hook portion to provide three yieldable restraining chords.

FIG. 5 is a fragmentary view, similar to FIG. 4, showing two strands of cord laced across the hook portion to provide two restraining chords.

FIG. 6 is a fragmentary side elevational view, partly in section and similar to FIG. 3, showing the manner in which a tension-adjusting screw may be applied to any given chordal span of cord to vary the angle and tension in the span after its initial installation across the hook portion of the temple bar.

FIG. 7 is a fragmentary side elevational view, similar to FIG. 6, showing the production of a yieldable chordal span by means of a slit temple arm boot or sock.

FIG. 8 is a perspective view of the slitted temple arm sock or boot in its free state.

Referring now to the drawings in detail, and in particular to FIG. 1, an articulated eyeglass assembly or frame has been designated in its entirety by the reference numeral 10 and it includes the usual lens windows 12 which surround the lenses 14 and nose pads 16 which straddle the nose of the wearer. Extending rearwardly from the lens windows 12 is a pair of temple bars 18 which terminate in the usual ear hooks or curved spatulas 20 having curved or arcuate ear-engaging forward edge surfaces 22 which normally are adapted to bear against and partially encompass the ear cartilage or concha of the ears and, when the eyeglass frame is properly adjusted, serve in combination with the nose pads 16 to maintain the lens windows 12 fixedly positioned in front of the eye pupils and at a proper distance therefrom for correct viewing purposes.

Referring now additionally to FIG. 2, the rear or distal end region of each temple bar 18 is provided with a series of closely spaced generally vertical bores 30 therethrough while the outer or lower distal end region of the ear hook or curved spatula 20 is provided with a similar series of generally transverse bores 32. The bores 30 and 32 are provided for the purpose of establishing anchor points or regions for the lacing therethrough of one or more strands of flexible cord stock material in a manner and for a purpose that will be set forth presently. Although six of the bores 30 have been illustrated in the first group of bores, and four of the bores 32 in the second group, a greater or lesser number of such bores may be employed in either group. For convenience of further description, the bores 30 have been labelled a, b, c, d, e and f, while the bores 32 have been labelled w, x, y and z.

In the form of the invention shown in FIG. 3, a single strand or length 40 of elastic cord material is shown as having been threaded through the bores 30 labelled d, c, z and y and tensioned so as to provide a chordal strut which extends across the generally arcuate forward edge surface 22 of the ear hook 20. Installation of the elastic cord 40 may be facilitated by cutting the cord to length and thereafter dipping the end portions thereof in a suitable hardening material to provide end tips comparable to the ends of shoe laces. Any other known means might be used to provide stiff ends of the cord. One or more lengths of the cord are laced into the bores, or a single cord may be laced through specified bores, as shown in FIG. 4, with the cord being placed with a desired stiffened cord tension. Stiffened tips of the cord and sharp angled bends serve to maintain the cord in position.

Although the bores d, c, z and y are utilized in FIG. 3 for receiving the cord 40, it is obvious that other bores may be selected for the threading operation if desired. Ordinarily, threading an end of the cord through one bore and into another will suffice to hold the end region of the cord from pulling away, even if relatively high tension is desired in the exposed ear-engaging chordal length. However, additional end threading may be resorted to if desired. It will be understood that by selecting various bores 30 and 32 for the threading operation, both the length of the chordal span and its angular relationship relative to the axis of the temple bar 18 may be varied at will. For example, the longest cord that may be attained is created by performing the threading operation so that the chordal span emerges from the bore 30 labelled a and the bore 30 labelled z. The shortest chordal span attainable is when the cord 40 emerges from the bore f and the bore w. The greatest deviation of the chordal span 40 from a vertical plane is effected when the bores 30b and the bore 32z are employed for cord emergence. With six of the bores 30 and four of the bores 32, twenty-four different cord lengths and twenty-four cord angularities relative to a vertical plane are possible.

The bores described may be straight bores or tapered bores, for convenience of inserting the cord. Although any known means may be used to secure the ends of the cords in the bores, it will be observed that this can be done without adhesive or other means, if the tips of the cords are stiffened and if the angle of the cord leaving the bore is minimal.

In applying the eyeglasses to the head of a user, the frame is positioned so that the lens windows 12 oppose the eye pupils with the nose pads 16 resting on the nose. The ear hooks or spatulas, and also the elastic cords are brought behind the ears and the frame is then released, whereupon the chordal spans will engage the exposed ear conchas so that the temple bars 18 exist under mild tension and serve to draw the entire eyeglass frame rearwardly, thus causing the nose pads 16 to ride upwardly on the nose to properly locate the eyeglass frame on the head of the user as previously described.

In FIG. 4, a modified form of the invention is shown wherein a single cord length is threaded through the bores 30 labelled c, d and e and the bores 32 labelled x, y and z so as to provide three chordal lengths 40a, 40b, and 40c. This serves to provide the wearer with some degree of selection. If the fit is too tight, he can snip and remove cord 40a, for example.

In FIG. 5, another modified form of the invention is shown. In this view, the bores 130 labelled a, b, c, d, and e project substantially transversely through the distal end region of the temple bar 118 and the bores 132 labelled w, x, y and z remain the same as the corresponding bores of the invention shown in FIG. 3. That is, these are substantially longitudinal to the temple bar. The bores 130 and 132 which are employed for the cord-threading operation are the bores 130 labelled b and d and the bores 132 labelled y and z.

In FIG. 6, only two bores 330 labelled a and b are provided in the temple arm 318 and a single bore labelled z is provided in the ear hook 332, thus allowing a single chordal span 340 to be established. The originally established cord 340 is illustrated in dotted lines but, according to this form of the invention, an adjusting screw 350 is threadedly received through the ear hook 320 and its forward end is engageable with the chordal span 340 to alter its angularity relative to the conchas of the ears and affect varying eyeglass frame adjustment relative to the head of the user. Regardless of the adjustment which may be made by the adjusting screw 350, the physical shape or contour of the eyeglass frame as a whole is not altered. This form of the invention will afford an eyeglass frame that has substantially universal application to varying sizes of human heads, and it renders it unnecessary for an eyeglass customer to select eyeglass frames having specific length temple bars. Since a single length temple bar will suffice for both large and small heads, this form of the invention lends itself to drugstore and supermarket displayed eyeglasses where the services of an optician are not provided.

In FIG. 7, a further modified form of the invention is disclosed. In this view, the conventional elastic cord is dispensed with and, in its stead, a conventional temple bar boot or sock 440 (see also FIG. 7) which may be of the type shown and described in U.S. Pat. No. 3,684,356, granted on Aug. 15, 1972 and entitled TEMPLE BOOTS is employed. The boot 440 is adapted for use as a chordal strut or cord by forming a longitudinal slit 442 in one side thereof as shown in FIG. 7 and thereafter slipping the boot endwise over the distal end of the hook portion 420 of the temple arm 418 and allowing the apex of the curved hook portion to project outwardly through the slit 442. A suitable adhesive or a wedge may be applied to the unslitted sleeve-like end portion 444 of the boot 440 so that it will not slide on the temple bar 418 when the chordal span has been brought to the desired degree of tension. In this form of the invention, the relatively large diameter of the elastic boot 440 makes wide contact with the exposed ear concha and affords an extremely firm restraining means for the eyeglass frames when installed on the head of the user.

This invention is not to be limited to the exact arrangement shown in the accompanying drawings or described in this specification since various changes in the details of construction may be resorted to without departing from the spirit of the invention. Therefore, only insofar as the invention has been particularly pointed out in the accompanying claims, is the same to be limited.

What is claimed is:

1. In an articulated eyeglass frame provided with lens windows from which there project rearwardly a pair of substantially horizontal temple bars having downardly extending curved ear hooks at their distal ends, the improvement comprising: at least one elastic cord connected at one of its ends to the juncture region between each temple bar and its curved ear hook and at its other end to the lower end of the ear hook and extending in chordal fashion across the hook to partially wrap itself at the back of a user's ear so as to yieldingly urge the temple bars rearwardly on the head of the user.

2. The improvement set forth in claim 1 comprising means whereby the points of attachment of said elastic cord to said juncture region and said distal end region may be selectively varied to vary the chordal length of said flexible cord, as well as its angularity with respect to a vertical plane.

3. The improvement set forth in claim 2, wherein said means for varying said points of attachment include the provision of a first group of one or more closely spaced bores in said juncture region and a second group of one or more closely spaced bores in said distal end region, said bores being designed for selective threading of the corresponding ends of said elastic cord therethrough.

4. The improvement set forth in claim 3 wherein said bores are tapered.

5. The improvement set forth in claim 3 wherein each end of said cord is threadedly received in at least one bore of each of said respective groups of one or more bores anchored therein with an exposed portion of said cord projecting in chordal fashion across said ear hook.

6. The improvement set forth in claim 5 wherein the end regions of said flexible cord are stiffened to prevent inadvertant removal from the engaged bore.

7. The improvement set forth in claim 5 wherein the bores of said first group project substantially vertically through the associated temple bar.

8. The improvement set forth in claim 5 wherein the bores of said first group project substantially horizontally through the associated temple bar.

9. The improvement set forth in claim 5 wherein said bores are formed at an angle to provide maximum bend of engaged cord emerging from the bore.

10. The improvement set forth in claim 1 comprising, additionally, an adjusting screw threadedly engaged through said ear hook and having a forward end engageable with the chordal portion of said elastic cord for varying the angularity of the the user's ear cartilage-engaging portion of said cord.

11. The improvement set forth in claim 1 wherein said flexible cord is in the form of an elongated closed-end sock, one for each temple bar, said sock being telescopically received over the ear hook and adjacent portion of the temple bar, said sock being formed of a yieldable elastomeric material and provided with an elongated longitudinal slit in one side thereof, the closed end of said sock engaging the distal end of the ear hook and the open end of said sock engaging the juncture region between the bar and the hook, the slit permitting the sock to extend between the fastened portions of the sock in chordal fashion across the end regions of said hook.

* * * * *